United States Patent
Quachtran et al.

(10) Patent No.: US 11,736,363 B2
(45) Date of Patent: Aug. 22, 2023

(54) TECHNIQUES FOR ANALYZING A NETWORK AND INCREASING NETWORK AVAILABILITY

(71) Applicant: DISNEY ENTERPRISES, INC., Burbank, CA (US)

(72) Inventors: Benjamin Quachtran, Sherman Oaks, CA (US); Ian Conrad McLein, Newbury Park, CA (US); Daniel Ryan Hare, Buena Park, CA (US); Nina Zalah Sanchez, Glendale, CA (US); Sona Kokonyan, Valley Glen, CA (US)

(73) Assignee: Disney Enterprises, Inc., Burbank, CA (US)

( * ) Notice: Subject to any disclaimer, the term of this patent is extended or adjusted under 35 U.S.C. 154(b) by 782 days.

(21) Appl. No.: 16/206,964

(22) Filed: Nov. 30, 2018

(65) Prior Publication Data

US 2020/0177468 A1 Jun. 4, 2020

(51) Int. Cl.
*H04L 41/147* (2022.01)
*G06N 3/088* (2023.01)
*H04L 41/16* (2022.01)
*G06N 3/042* (2023.01)
*G06N 3/044* (2023.01)

(52) U.S. Cl.
CPC ........... *H04L 41/147* (2013.01); *G06N 3/042* (2023.01); *G06N 3/044* (2023.01); *G06N 3/088* (2013.01); *H04L 41/16* (2013.01)

(58) Field of Classification Search
CPC ..... H04L 41/147; H04L 41/16; G06N 3/0445; G06N 3/088; G06N 3/0427
See application file for complete search history.

(56) References Cited

U.S. PATENT DOCUMENTS 9,400,731 B1 * 7/2016 Preece ................ G06F 11/3447
2009/0204232 A1 * 8/2009 Guru ....................... G06Q 50/04
700/12

(Continued)

OTHER PUBLICATIONS

Panneerselvam et al. (Workload Analysis for the Scope of User Demand Prediction Model Evaluations in Cloud Environments, Dec. 2014, pp. 883-889) (Year: 2014).*

(Continued)

*Primary Examiner* — George Giroux
(74) *Attorney, Agent, or Firm* — Artegis Law Group, LLP (57) ABSTRACT

In various embodiments, a prediction subsystem automatically predicts a level of network availability of a device network. The prediction subsystem computes a set of predicted attribute values for a set of devices attributes associated with the device network based on a trained recurrent neural network (RNN) and set(s) of past attribute values for the set of device attributes. The prediction subsystem then performs classification operation(s) based on the set of predicted attribute values and one or more machine-learned classification criteria. The result of the classification operation(s) is a network availability data point that predicts a level of network availability of the device network. Preemptive action(s) are subsequently performed on the device network based on the network availability data point. By performing the preemptive action(s), the amount of time during which network availability is below a given level can be substantially reduced compared to prior art, reactive approaches.

20 Claims, 4 Drawing Sheets

(56) References Cited

U.S. PATENT DOCUMENTS

| | | | | |
|---|---|---|---|---|
| 2012/0192016 A1* | 7/2012 | Gotesdyner | ......... | H04L 12/6418 |
| | | | | 714/E11.179 |
| 2017/0046510 A1* | 2/2017 | Chen | ..................... | G06F 21/552 |
| 2017/0148433 A1* | 5/2017 | Catanzaro | ............. | G10L 15/183 |
| 2017/0220854 A1* | 8/2017 | Yang | ....................... | G06K 9/522 |
| 2017/0249445 A1* | 8/2017 | Devries | ................. | G16H 20/60 |
| 2017/0293542 A1* | 10/2017 | Xu | ........................ | G06F 11/008 |
| 2017/0293543 A1* | 10/2017 | Xu | ........................ | G06F 11/008 |

OTHER PUBLICATIONS

Wang et al. (Cloud Workload Analytics for Real-Time Prediction of User Request Patterns, Jun. 2018, pp. 1677-1685) (Year: 2018).*
Radhika et al. (An Efficient Predictive Technique to Autoscale the Resources for Web Applications in Private Cloud, Feb. 2018, pp. 1-7) (Year: 2018).*
Andrzejak et al. (Ensuring Collective Availability in Volatile Resource Pools via Forecasting, 2008, pp. 1-13) (Year: 2008).*
Trinh et al. (Mobile Traffic Prediction from Raw Data Using LSTM Networks, Sep. 2018, pp. 1827-1832) (Year: 2018).*
Tang et al. (Bayesian Model-based Prediction of Service Level Agreement Violation for Cloud Services, Sep. 2014, pp. 170-176) (Year: 2014).*
Farahnakian et al. (LiRCUP: Linear Regression based CPU Usage Prediction Algorithm for Live Migration of Virtual Machines in Data Centers, Sep. 2013, pp. 357-364) (Year: 2013).*

* cited by examiner

TECHNIQUES FOR ANALYZING A NETWORK AND INCREASING NETWORK AVAILABILITY

BACKGROUND

Field of the Various Embodiments

Embodiments of the present invention relate generally to networking technology and, more specifically, to techniques for analyzing a network to increase network availability.

Description of the Related Art

Ensuring that network devices are available to users is an important aspect of providing effective network-based services. Typically, if the operation of one or more devices included in a device network is deficient, then the overall availability of the device network can be compromised, and some users may be unable to access or use the services provided by the device network. To maintain appropriate levels of network availability, service providers oftentimes implement monitoring tools that automatically monitor a variety of attributes related to the operation of different devices included in a device network. If, at any point in time, a monitoring tool receives an attribute value that indicates that the operation of a particular network device is deficient, then the monitoring tool generates an alert. When an engineer notices the alert, the engineer is able to troubleshoot the device and perform remediation operations on the device and/or device network to restore network availability to the appropriate level.

One drawback of the "reactive" approach to network analysis and remediation described above is that the operation of at least one network device needs to be deficient before a monitoring tool generates an alert. The subsequent process of noticing the alert, troubleshooting the device, determining appropriate remediation operations, and executing the remediation operations is primarily manual and, therefore, can be tedious and time-consuming. Consequently, the time required to restore network availability to an appropriate level can be unacceptably long. For example, suppose that a connection between a website server for an airline reservation service and the Internet gradually degrades over time. Eventually, a monitoring tool would generate an alert based on the value of an attribute, such as the number of dropped packets associated with the website server, that indicates the degradation of the connection. However, the overall performance and availability of the airline reservation service would be reduced until an engineer noticed the alert and, in response, fixed the connection or replaced the website server.

As the foregoing illustrates, what is needed in the art are more effective techniques for analyzing networks to maintain or increase network availability.

SUMMARY

One embodiment of the present invention sets forth a computer-implemented method for analyzing a network and increasing network performance. The method includes computing a set of predicted attribute values for a set of device attributes associated with a device network based on a trained recurrent neural network (RNN) and at least one set of past attribute values for the set of device attributes; and performing one or more classification operations based on the set of predicted attribute values and one or more machine-learned classification criteria to generate a network availability data point that predicts a first level of availability of the device network, where at least one preemptive action is subsequently performed on the device network based on the network availability data point.

At least one technical advantage of the disclosed techniques relative to the prior art is that, with the disclosed techniques, the operations of devices within a device network are analyzed in an automated and preemptive fashion. In that regard, forward-looking attribute values for a set of device attributes are predicted based on past attribute values for that same set of device attributes. The forward-looking attributes values are then automatically mapped to a network availability data point that indicates a predicted level of availability for the device network. Based on the predicted level of availability, troubleshooting operations and other remedial activities can be performed preemptively, before the actual availability of the device network falls below some appropriate or desired level. By performing troubleshooting operations and other remedial activities preemptively, the amount of time during which network availability is below the appropriate or desired level can be substantially reduced. These technical advantages provide one or more technological advancements over the prior art.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
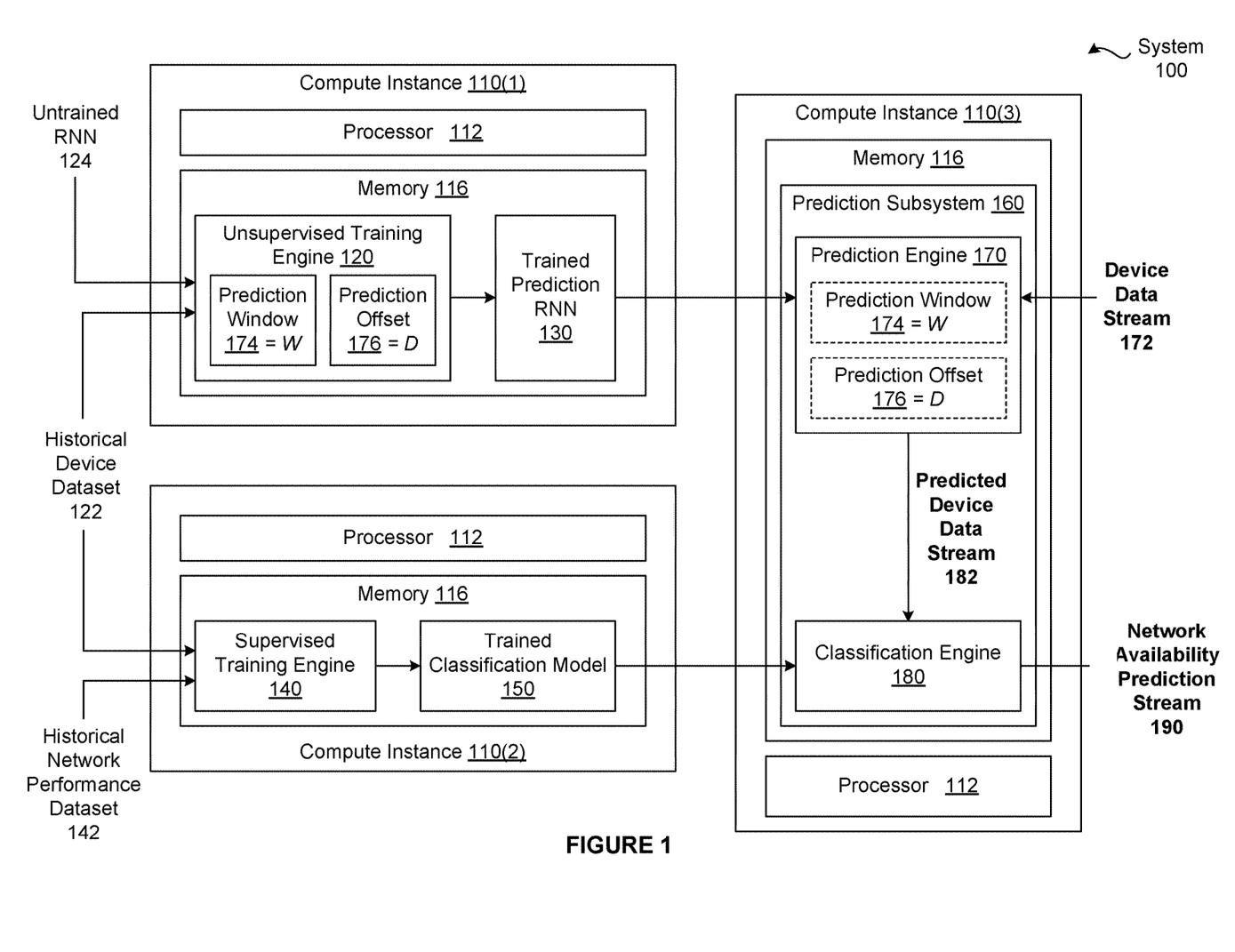
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, any number of compute instances 110. For explanatory purposes, multiple instances of like objects are denoted with reference numbers identifying the object and parenthetical numbers identifying the instance where needed. In various embodiments, any number of the components of the system 100 may be distributed across multiple geographic locations or included in one or more cloud computing environments (i.e., encapsulated shared resources, software, data, etc.) in any combination.

As shown, each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. In alternate embodiments, each of the compute instances 110 may include any number of processors 112.

The memory 116 stores content, such as software applications and data, for use by the processor 112 of the compute instance 110. The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, each of the compute instances 110 is configured to implement one or more applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications may be consolidated into a single application or subsystem.

In particular, the compute instance 110(3) is configured to analyze a device network to maintain or increase the network availability of the device network. As referred to herein, a "device network" includes any number and type of interconnected devices that perform one or more services for any number of users. Examples of types of devices include, without limitation, compute devices, user devices, electromechanical devices, and mechanical devices. An example of a compute device is a compute instance 110, an example of a user device is a smartphone, an example of an electromechanical device is a motor, and an example of a mechanical device is a shutter of a camera. An exemplary service could allow a user to store data, manipulate data, communicate data, purchase merchandise, sell merchandise, view and/or stream videos, physically move from one geographic location to another geographic location, experience an amusement park attraction, and so forth. A device included in a device network is also referred to herein as a "network device."

In general, ensuring that network devices are available to users is an important aspect of providing effective network-based services. Typically, if the operation of one or more devices included in a device network is deficient, then the overall availability of the device network can be compromised, and some users may be unable to access or use the services provided by the device network. The overall availability of a device network is referred to herein as the "network availability" of the device network and may be defined and measured in any technically feasible fashion.

For instance, the network availability of a device network that provides an airplane reservation service may be defined as a ratio between the current rate at which the airplane reservation service can process reservations and the maximum rate at which the airplane reservation service can process reservations. If the network availability for the device network that provides the airplane reservation service is 50%, then the device network is degraded and can only process half the reservations that the device network is capable of processing. As a result, attempts by users to make reservations via the airplane reservation service may be hindered and the users may become frustrated.

To maintain appropriate levels of network availability, service providers oftentimes implement monitoring tools that automatically monitor a variety of attributes related to the operation of different devices included in a device network. Examples of attributes includes, without limitation, point of entry (PoE) utilization, latency, dropped packets, energy usage, memory utilization, central processing unit (CPU) utilization, machine-generated data, thermal data, cyclic redundancy check (CRC) errors, vibration level, link state, port state, route table, buffer utilization, energy usage, memory usage, error messaging, etc. Each network device may be associated with any number and type of attributes in any technically feasible fashion, and different network devices may be associated with different attributes. For explanatory purposes only, an attribute associated with a device is also referred to herein as "device attribute" and a particular value for the device attribute is also referred to herein as an "attribute value."

In a conventional approach to maintaining appropriate levels of network availability, if, at any point in time, a conventional monitoring tool receives an attribute value that indicates that the operation of a particular network device is deficient, then the conventional monitoring tool generates an alert. When an engineer notices the alert, the engineer is able to troubleshoot the device and and perform remediation operations on the device and/or device network to restore network availability to the appropriate level.

One drawback of such a "reactive" approach is that the operation of at least one network device needs to be deficient before a conventional monitoring tool generates an alert. The subsequent process of noticing the alert, troubleshooting the device, determining appropriate remediation operations, and executing the remediation operations is primarily manual and, therefore, can be tedious and time-consuming. Consequently, the time required to restore network availability to an appropriate level can be unacceptably long.

Automatically Predicting Forward-Looking Levels of Availability for a Device Network To more effectively maintain and/or increase network availability, the system 100 includes, without limitation, an unsupervised training engine 120, a supervised training engine 140, and a prediction subsystem 160. In general, the unsupervised training engine 120 and the supervised training engine 140 enable the prediction subsystem 160 to predict a forward-looking level of availability for a device network. If the predicted level of availability falls below some appropriate or desired level, then troubleshooting operations and other remedial activities can be performed preemptively, before the actual availability of the device network falls below some appropriate or desired level.

The unsupervised training engine 120 resides in the memory 116 and executes on the processor 112 of the compute instance 110(1) during a training phase. In operation, the unsupervised training engine 120 performs training operations on an untrained recurrent neural network (RNN) 124 based on a historical device dataset 122 to generate a trained prediction recurrent neural network (RNN) 130. As persons skilled in the art will recognize, an RNN is a computational method for modeling relationships between temporal data points using deep learning primitives. The unsupervised training engine 120 may acquire the untrained RNN 124 in any technically feasible fashion. Further, the untrained RNN 120 and the trained RNN 130 may be implemented in any technically feasible fashion. For instance, in some embodiments, the trained prediction RNN 130 may be a long short-term memory (LTSM) network that includes, without limitation, any number of LTSM primitives.

Although not shown in FIG. 1, the historical device dataset 122 includes, without limitation, a device attribute set, any number of attribute value sets, and any number of time steps. A device attribute set is also referred to herein as a "set of device attributes." The device attribute set includes, without limitation, any number of device attributes, where each device attribute is associated with a different combination of a network device and an attribute associated with the network device. Each attribute value set specifies a set of attribute values for the device attribute set at a different time step. As referred to herein, a time step represents a discrete time.

Each of the attribute value sets included in the historical device dataset 122 is associated with a different time step representing a different time that occurred in the past. For example, the historical device dataset 122 could specify attribute value sets for five hundred different device attributes over the twelve previous months, with a difference of 10 minutes between consecutive time steps. An attribute value set that is associated with a time that has already occurred is also referred to herein as a "past attribute value set."

As shown, the unsupervised training engine 120 includes, without limitation, a prediction window 174 and a prediction offset 176. The prediction window 174 specifies the number of levels of deep learning primitives that the trained prediction RNN 130 implements, where each level is associated with a different time step. The prediction offset 176 specifies the number of time steps between a time step associated with the final level of deep learning primitives included in the trained prediction RNN 130 and a time step associated with an output of the trained prediction RNN 130.

In operation, the unsupervised training engine 120 generates training data (not shown) that includes any number of training data points based on the historical device dataset 122, the prediction window 174, and the prediction offset 176. Each training data point is associated with a different time step T and specifies, without limitation, multiple input attribute value sets and an expected output attribute value set. The input attribute value sets are associated with time steps that span from the time step (T−W) to the time step T, where W is equal to the prediction window 174. The expected output attribute value set is associated with the time step (T+D), where D is equal to the prediction offset 176. Subsequently, for each training data point, the unsupervised training engine 120 performs any number and type of machine learning operations that train the untrained RNN 124 to predict the associated output attribute value set based on the associated input attribute value sets.

As persons skilled in the art will recognize, the trained prediction RNN 130 accurately predicts a forward-looking attribute value set based on past attribute value sets associated with times that have occurred. Notably, because each training data point includes multiple input attribute values sets, the trained prediction RNN 130 can reliably predict forward-looking attribute values based on complex temporal patterns between the past attribute values for any number of device attributes.

In alternate embodiments, the system 100 may generate any type of trained prediction RNN 130 in any technically feasible fashion based on any amount and type of training data that is acquired and organized in any manner. For instance, in some embodiments, the system 100 may include a semi-supervised training engine that performs any number and type of semi-supervised learning operations on a partially trained RNN based on any amount of device data acquired in any technically feasible fashion to generate the trained prediction RNN 130.

The supervised training engine 140 resides in the memory 116 and executes on the processor 112 of the compute instance 110(2) during the training phase. As described in greater detail in conjunction with FIG. 2, the supervised training engine 140 generates a trained classification model 150 based on the historical device dataset 122 and a historical network performance dataset 142. The historical network performance dataset 142 may specify any amount and type of data points (not shown) associated with the network availability of the device network in any technically feasible fashion. Each data point is associated with a different time step. Further, the time steps associated with the historical network performance dataset 142 overlaps, at least in part, the time steps associated with the historical device dataset 122.

The trained classification model 150 maps an attribute value set for the device attribute set to a network availability data point that is associated with a network availability of the device network. The network availability data point may directly or indirectly specify a network availability in any technically feasible fashion. For instance, in some embodiments, the network availability data point is a probability distribution of network states, where each network state is associated with a different degradation in network availability.

The prediction subsystem 160 resides in the memory 116 and executes on the processor 112 of the compute instance 110(3) during an execution phase that occurs after the training phase has finished. As shown, the prediction subsystem 160 receives a device data stream 172 and generates a network availability prediction stream 190. Typically, the prediction subsystem 160 receives the device data stream 172 and generates the network availability prediction stream 190 in real-time. As shown, the prediction subsystem 160 includes, without limitation, a prediction engine 170 and a classification engine 180.

The prediction engine 170 receives the device data stream 172 and generates a predicted device data stream 182 based on the trained prediction RNN 130. The device data stream 172 includes, without limitation, a temporal sequence of attribute value sets and the associated time stamps. A given attribute value set included in the device data stream 172 specifies attribute values observed at a past time that is specified via the associated time step. The prediction subsystem 160 may receive the device data stream 172 in any technically feasible fashion from any number and type of monitoring applications.

As depicted with dashed boxes, the prediction engine 170 is associated with the prediction window 174 of W and the prediction offset 176 of D. As the prediction engine 170 receives an attribute value set via the device data stream 172, the prediction engine 170 inputs the attribute value set to the trained prediction RNN 130. After receiving at least enough attribute value sets to span the prediction window 174, the prediction engine 170 generates the predicted device data stream 182 in real-time. The received attribute value sets span the prediction window 174 when the difference between the time step associated with the latest attribute value set and the time step associated with the earliest attribute value set is greater than or equal to the prediction window 174 of W.

More specifically, after providing the attribute value set associated with the time step T as an input to the trained prediction RNN 130, the prediction engine 170 associates the resulting output attribute value set of the trained prediction RNN 130 with the forward-looking time step (T+D). The prediction engine 170 then appends the output attribute value set and the associated forward-looking time step to the predicted device data stream 182. As a result, the predicted device data stream 182 includes, without limitation, a temporal sequence of attribute value sets and the associated time stamps. Each attribute value set included in the predicted device data stream 182 specifies predicted attribute values for a time that is specified via the associated time step. Importantly, at any given time, the difference between the forward-looking time step associated with the most recent attribute value set included in the predicted device data stream 182 and the past time step associated with the most recent attribute value set included in the device data stream 172 is equal to the prediction offset 176 of D.

The classification engine 180 receives the predicted device data stream 182 and generates the network availability prediction stream 190 based on the trained classification model 150. When the classification engine 180 receives a predicted attribute value set associated with a forward-looking time step via the predicted device data stream 182, the prediction engine 170 provides the predicted attribute value set to the trained classification model 150. The output of the trained classification model 150 is a network availability data point associated with the forward-looking time step. The classification engine 180 appends the network availability data point and the associated forward-looking time stamp to the network availability prediction stream 190. As a result, each network availability data point included in the network availability prediction stream 190 predicts a different level of availability for the device network.

Advantageously, by accurately predicting network availability data points for the device network, the prediction subsystem 160 enables troubleshooting operations and one or more remedial activities to be performed in a preemptive fashion. Performing these types of "preemptive actions" can substantially reduce the amount of time during which a network availability is below an appropriate or desired level. The prediction subsystem 160 is described in greater detail in conjunction with FIG. 3.

In alternate embodiments, the prediction subsystem 160 or a preemptive application included in the system 100 may automatically perform any number and type of preemptive actions based on the network availability prediction stream 160, the device data stream 172, and the predicted device data stream 182, in any combination. The prediction subsystem 160 or the preemptive application may perform the one or more preemptive actions directly or indirectly in any technically feasible fashion. For instance, in some embodiments, the prediction subsystem 160 may allocate additional computing resources to or reallocate computing resources among any number of the devices included in the device network. In the same or other embodiments, the prediction subsystem 160 may terminate certain operations associated with any number of the devices included in the device network.

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. As a general matter, the techniques outlined herein are applicable to predicting a forward-looking level of availability for a device network based on past attribute values for a set of device attributes associated with the device network, any type of trained RNN, and any number and type of classification operations.

Training a Classification Model to Automatically Compute Network Availability

Figure 2:
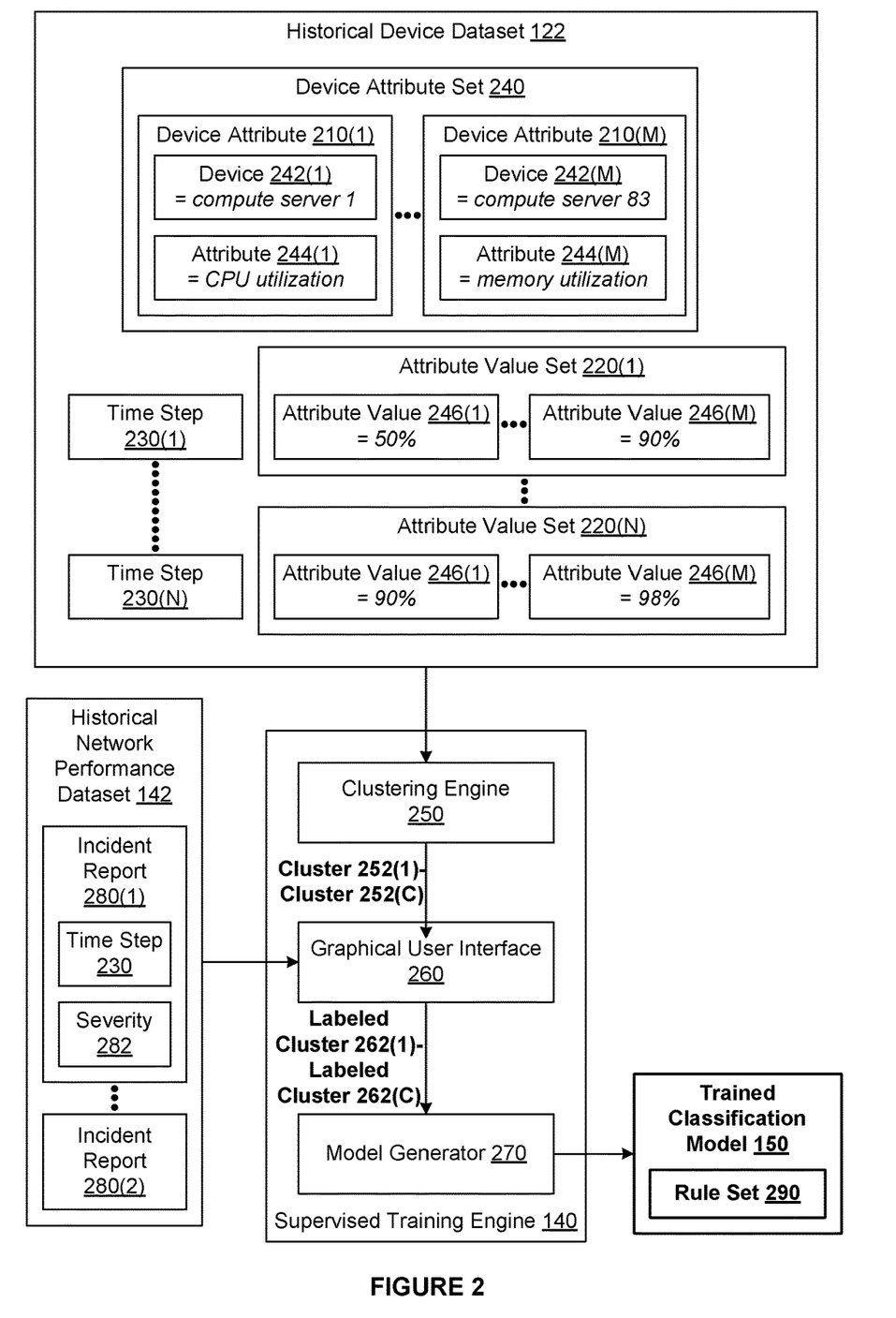
FIG. 2 is a more detailed illustration of the supervised training engine of FIG. 1, according to various embodiments of the present invention.

FIG. 2 is a more detailed illustration of the supervised training engine 140 of FIG. 1, according to various embodiments of the present invention. The supervised training engine 140 generates the trained classification model 150 based on the historical device dataset 122 and the historical network performance dataset 142. As shown, the supervised training engine 140 includes, without limitation, a clustering engine 250, a graphical user interface (GUI) 260, and a model generator 270.

The clustering engine 250 generates clusters 252 based on the historical device dataset 122. The historical device dataset 122 includes, without limitation, a device attribute set 240, any number of time steps 230(1)-230(N), and any number of attribute value sets 220(1)-220(N). The device attribute set 240 includes, without limitation, any number of device attributes 210(1)-210(M). Each of the device attributes 210 is associated with a different combination of a device 242 included in the device network and an attribute 244. For example, the device attribute 210(1) could be associated with a first compute server included in the device network and a CPU utilization. By contrast, the device attribute 210(M) could be associated with an eighty-third compute server included in the device network and a memory utilization.

Each of the time steps 230 is associated with a different discrete point in time in any technically feasible fashion, and any two consecutive time steps 230 may be associated with any time difference. For explanatory purposes only, if a first time step is smaller than a second time step, then the first time step is associated with a time that occurs before a time that is associated with the second time step. In general, the time steps 230(1)-230(M) included in the historical device dataset 122 are associated with times that have already occurred in an order from an earliest time to a latest time. For example, the time step 244(100) of 53 could be associated with a time of 10:45 AM on a particular day, and the subsequent time step 244(101) of 54 could be associated with a time of 11:00 AM on the same day.

The attribute value set $220(x)$ is associated with the time step $230(x)$ and includes, without limitation, the attribute values 246(1)-246(M). For explanatory purposes only, the attribute value $246(y)$ included in the attribute value set $220(x)$ is the value for the device attribute $210(y)$ at the time associated with the time step 244(*x*). For example, the attribute value set 220(1) could specify that, at a first time, the attribute value 246(1) for the device attribute 210(1) was 50% and the attribute value 246(M) for the device attribute 210(M) was 90%. The attribute value set 220(N) could specify that, at a second time three weeks after the first time, the attribute value 246(1) for the device attribute 244(1) was 90% and the attribute value 246(M) for the device attribute 244(M) was 98%.

The clustering engine 250 partitions the attribute value sets 220 included in the historical device dataset 122 into any number of clusters 252(1)-252(C). In general, the clustering engine 250 implements clustering operations to minimize a distance between attribute value sets 220 that are included in the same cluster 252. The clustering engine 250 may implement any number and type of clustering operations as well as any ancillary operations in any technically feasible fashion For instance, in some embodiments, the clustering engine 250 implements a k-means clustering algorithm to generate the clusters 252. First, to determine an optimized number of clusters 252, the clustering engine 250 executes a min-search algorithm based on the historical device dataset 122 and a sum of square errors (SSE) as an evaluation metric. The min-search algorithm identifies an injection point in an SSE plot and sets the optimized number of clusters 252 equal to a number of clusters 252 associated with the injection point. The clustering engine 250 then implements the k-mean clustering algorithm to generate the clusters 252, where the total number of clusters 252 equals the optimized number of clusters 252. Notably, each of the clusters 252 can be uniquely identified by the combination of the different ranges of attribute values 246 associated with the cluster 252 for each the device attributes 210.

Subsequently, the GUI 260 generates labeled clusters 262(1)-262(C) based on the clusters 252(1)-252(C) and the historical network performance dataset 142. As shown, the historical network performance dataset 142 includes, without limitation, any number and type of incident reports 280. Each incident report 280 includes, without limitation, the time step 230 and a severity 282. The GUI 260 may acquire the incident reports 280 from any number and type of sources in any technically feasible fashion. In alternate embodiments, the historical network performance dataset 142 may include any amount and type of data relevant to the performance of the device network. Further, the data may be acquired and organized in any technically feasible fashion.

The GUI 260 display the clusters 252(1)-252(C) and any amount and type of information associated with the historical network performance dataset 142 via the GUI 260. In response, the GUI 260 receives user input that assigns a different label to each of the clusters 252(1)-252(C). The GUI 260 then labels the clusters 252(1)-252(C) based on the different labels to generate the labeled clusters 252(1)-252 (C). Each of the labels is associated with a different network availability in any technically feasible fashion. For example, one label could indicate a 10%-20% degradation in network availability, and another label could indicate a 90%-100% degradation in network availability. In alternate embodiments, the GUI 360 may be replaced by a labeling engine that automatically labels the clusters 252(1)-252(C) in any technically feasible fashion based on any amount and type of data.

The model generator 270 implements any number and type of supervised machine learning operations to generate the trained classification model 150 based on the labeled clusters 262. For instance, in some embodiments, the model generator 270 implements a k-nearest neighbor algorithm to generate a rule set 290 based on the labeled clusters 262. The model generator 270 then generates the trained classification model 150 that includes, without limitation, the rule set 290. In alternate embodiments, the model generator 270 may generate the trained classification model 150 in any technicality feasible fashion, and the trained classification model 150 may implement any amount and type of machine-learned classification criteria instead of or in addition to the rule set 290.

The trained classification model 150 maps the attribute value set 220(*x*) associated with the time stamp 230(*x*) to a network availability data point associated with the time stamp 230(*x*). The trained classification model 150 may perform any amount and type of mapping operations in any technically feasible fashion. For instance, in some embodiments, the trained classification model 150 maps the attribute value set 220(*x*) to the network availability data point based on the rule set 290. In alternate embodiments, the trained classification model 150 may perform any amount and type of classification operations based on any amount and type of machine-learned classification criteria.

The network availability data point expresses an overall availability of the device network based on the labels included in the labeled clusters 262. For instance, in some embodiments, the network availability data point is a probability distribution with respect to the different labels associated with the labeled clusters 262, where each label specifies a different network state. In other embodiments, the network availability data point is a single label associated with the labeled clusters 262 and, optionally, a confidence value.

Automatically Predicting Network Availability

Figure 3:
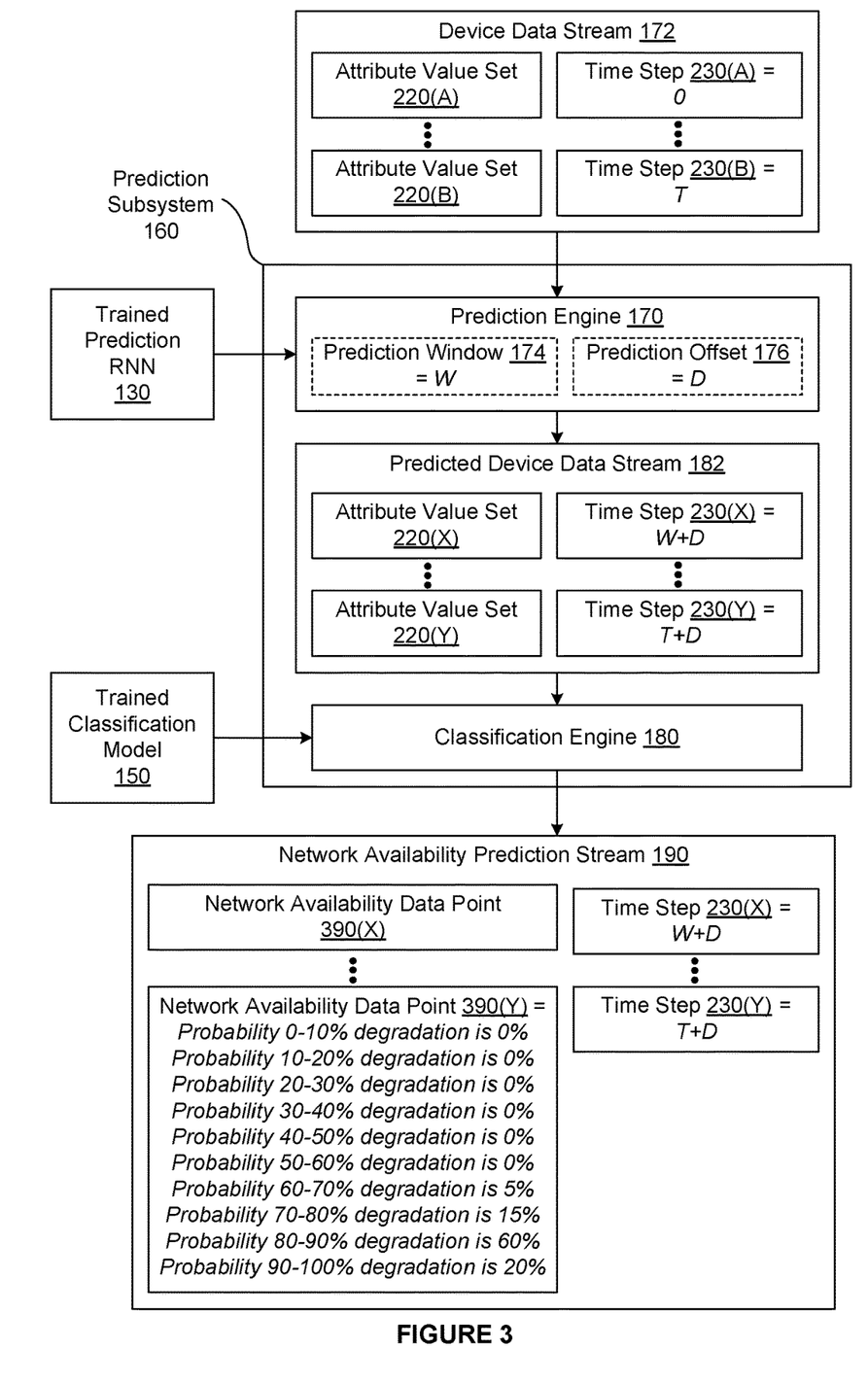
FIG. 3 is a more detailed illustration of the prediction subsystem of FIG. 1, according to various embodiments of the present invention.

FIG. 3 is a more detailed illustration of the prediction subsystem 160 of FIG. 1, according to various embodiments of the present invention. The prediction subsystem 160 generates the network availability prediction stream 190 based on the device data stream 172, the trained prediction RNN 130, and the trained classification model 150. As shown, the prediction subsystem 160 includes, without limitation, a prediction engine 170 and a classification engine 180.

The prediction engine 170 generates the predicted device data stream 182 based on the device data stream 172 and the trained prediction RNN 130. The device data stream 172 includes, without limitation, any number of attribute value sets 220(A)-220(B) and any number of time steps 230(A)-230(B). In general, the attribute value set 220(*x*) included in the device data stream 172 specifies the attribute values 246 for the device attributes 210 included in the device attribute set 240 that were observed at the time step 230(*x*). Further, the time steps 230(A)-230(B) are associated with times that have already occurred in an order from earliest time to latest time. Accordingly, the attribute value sets 220(A)-220(B) form a temporal sequence that spans from the time step 230(A) to time step 230(B). In general, the prediction engine 170 receives the attribute value sets 220 included in the device data stream 172 in real-time.

As depicted with dashed boxes and as described in conjunction with FIG. 1, the prediction engine 170 is associated with the prediction window 174 of W and the prediction offset 176 of D. The prediction window 174 and the prediction offset 176 may be expressed in any technically feasible fashion. For example, suppose that the time difference between any two consecutive time stamps 130 was equal to fifteen minutes. The prediction window 174 could specify a time step delta of 672 to indicate that the prediction window 174 was seven days. And the prediction offset 176 could specify a time step delta of 288 to indicate that the trained prediction RNN 130 was configured to predict attribute value sets 220 for three days in the future.

As the prediction engine 170 receives the new attribute value set 220(j) via the device data stream 172, the prediction engine 170 inputs the attribute value set 220(j) to the trained prediction RNN 130. After receiving the attribute value sets 220(A)-220(j) that span the prediction window 174, the prediction engine 170 generates the predicted device data stream 182 in real-time. More specifically, after providing the attribute value set 220(j) associated with the time step 230 of J as an input to the trained prediction RNN 130, the prediction engine 170 associates the output attribute value set 220 generated by the trained prediction RNN 130 with the forward-looking time step 230 of (J+D). The prediction engine 170 then appends the output attribute value set 220 and the forward-looking time step 230 to the predicted device data stream 182. As shown, at any given time, the predicted device data stream 182 includes, without limitation, the attribute value sets 220(X)-220(Y) generated using the trained prediction RNN 130 and the associated time steps 230(X)-230(Y).

Notably, the time step 230 associated with the most recent attribute value set 220 included in the predicted device data stream 182 is equal to the sum of the prediction offset 176 and the time step 230 associated with the most recent attribute value set 220 included in the device data stream 172. Accordingly, the predicted device data stream 182 anticipates the device data stream 172 by the prediction offset 176. Further, because the prediction window 174 is a positive value, the number of attribute value sets 122 included in the predicted device data stream 182 is no greater than the number of attribute value sets 122 included in the device data stream 172.

The classification engine 180 receives the predicted device data stream 182 and generates the network availability prediction stream 190 based on the trained classification model 150. More precisely, upon receiving the attribute value set 220(j) associated with a forward-looking time step 230(j) via the predicted device data stream 182, the prediction engine 170 generates a network availability point 390(j) associated with the time step 230(j) based on the trained classification model 150 and the attribute value set 220(j). The classification engine 180 then appends the network availability data point 390(j) and the associated time step 230(j) to the network availability prediction stream 190. In this fashion, the classification engine 180 generates the network availability prediction stream 190 in real-time. As shown, the network availability prediction stream 190 includes, without limitation, the time steps 230(X)-230(Y) and the associated network availability data points 290(X)-290(Y) generated using the trained classification model 150.

For explanatory purposes only, FIG. 3 depicts exemplary values for the first time step 230(A) and the last time step 230(B) that are included in the device data stream 172 at an exemplary point in time, the first time step 230(X) and the last time step 230(Y) that are included in the device data stream 172 at the exemplary point in time, and the network availability data point 390(Y). As shown, the time step 230(A) is equal to 0 and the time step 230(B) is equal to T. Because, the prediction window 174 is W, the prediction engine 170 does not generate the device data stream 182 until the prediction engine 170 has received the input attribute value set 220 associated with the time step 230 of W via the device data stream 172.

Upon receiving the input attribute value set 220 associated with the time step 230 of W via the device data stream 172, the prediction engine 170 generates the attribute value set 220(X) associated the time step 230(X) of (W+D) based on the trained prediction RNN 130. The prediction engine 170 then appends the attribute value set 220(X) and the associated time step 230(X) to the predicted device data stream 182. Upon receiving the attribute value set 220(X) via the predicted device data stream 182, the classification engine 180 generates the network availability data point 390(X) associated with the time step 230(X) of (W+D). The classification engine 180 then appends the network availability data point 390(X) and the time step 230(X) to the network availability prediction stream 190.

At a later time, upon receiving the input attribute value set 220(B) associated with the time step 230(B) of T via the device data stream 172, the prediction engine 170 generates the output attribute value set 220(Y) associated with the time step 230(Y) of (T+D) based on the trained prediction RNN 130. The prediction engine 170 then appends the attribute value set 220(Y) to the predicted device data stream 182. Upon receiving the attribute value set 220(Y) via the predicted device data stream 182, the classification engine 180 generates the network availability data point 390(Y) associated with the time step 230(Y) of (T+D). As shown, the network availability data point 390(Y) specifies a probability distribution for ten different network states, where each network state is associated with a different network degradation range. The classification engine 180 then appends the network availability data point 390(Y) and the time step 230(Y) to the network availability prediction stream 190.

Figure 4:
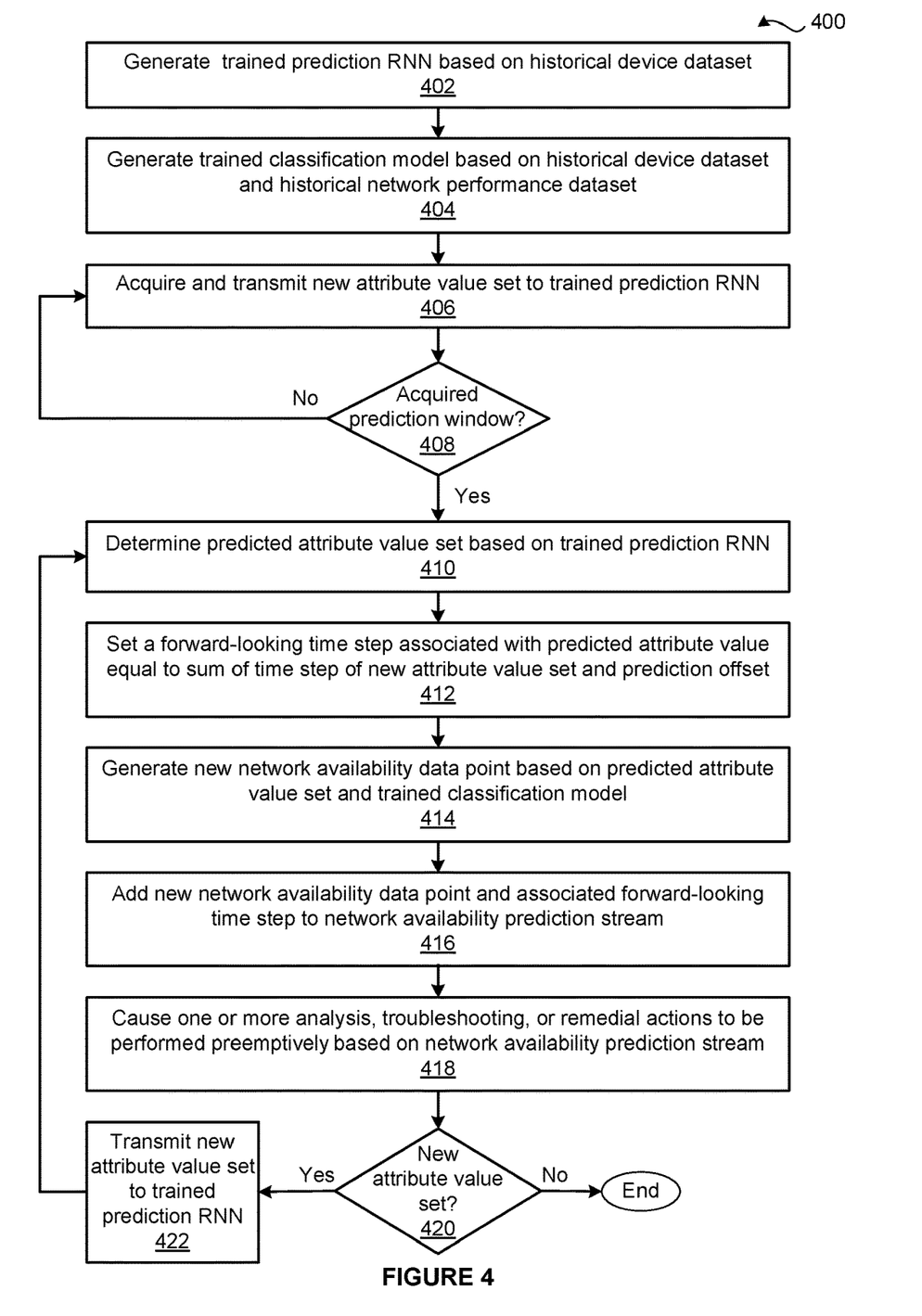
FIG. 4 is a flow diagram of method steps for analyzing a network and increasing network performance, according to various embodiments of the present invention.

FIG. 4 is a flow diagram of method steps for analyzing a network and increasing network performance, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the unsupervised training engine 120 trains the untrained RNN 122 based on the historical device dataset 122 to generate the trained predicted RNN 130. At step 404, the supervised training engine 140 generates the trained classification model 150 based on the historical device dataset 122 and the historical network performance dataset 142. At step 406, the prediction engine 170 acquires a new attribute value set 220 included in the current device data stream 172 and then transmits the new attribute value set 220 to the trained predicted RNN 130 as a new input.

At step 408, the prediction engine 170 determines whether the prediction engine 170 has acquired the attribute value sets 220 that, together, span the prediction window 174. The attribute value sets 220 span the prediction window 174 when the difference between the time step 230 associated with the latest attribute value set 220 and the time step 230 associated with the earliest attribute value set 220 is greater than or equal to the prediction window 174. If, at step 408, the prediction engine 170 determines that the prediction engine 170 has not acquired the attribute value sets 220 that, together, span the prediction window 174, then the method 400 returns to step 406. At step 406, the prediction engine 170 acquires a new attribute value set 220 included in the current device data stream 172 and then transmits the new attribute value set 220 to the trained predicted RNN 130 as a new input.

If, however, at step 408, the prediction engine 170 determines that the prediction engine 170 has acquired the attribute value sets 220 that, together, span the prediction window 174, then the method 400 proceeds to step 410. At step 410, the prediction engine 170 determines a predicted attribute value set 220 based on the output of the trained prediction RNN 130. At step 412, the prediction engine 170 sets a forward-looking time step 230 associated with the predicted attribute value set 220 equal to the sum of the time step 230 of the new attribute value set 220 and the prediction offset 176 associated with the trained prediction RNN 130.

At step 414, the classification engine 180 generates a new network availability data point 390 based on the predicted attribute value set 220 and the trained classification model 150. At step 416, the classification engine 180 adds the new network availability data point 390 and the associated forward-looking time step 230 to the network availability prediction stream 190. At step 418, the prediction subsystem 160 causes one or more analysis, troubleshooting, or remedial actions to be performed preemptively based on network availability prediction stream 190.

In alternate embodiments, the prediction subsystem 160 can further initiate any number of preemptive actions (e.g., analysis, troubleshooting, remedial, etc.) based on any of the network availability prediction stream 190, the device data stream 172, and the predicted device data stream 182, in any combination. For instance, in various embodiments, a remedial action may be an allocation of computing resources to any number of the devices included in the device network. In the same or other embodiments, a remedial action may be terminating certain operations associated with any number of the devices included in the device network.

At step 420, the prediction engine 170 determines whether the device data stream 172 includes a new attribute value set 220. If, at step 420, the prediction engine 170 determines that the device data stream 172 includes a new attribute value set 220, then the method 400 proceeds to step 422. At step 422, the prediction engine 170 acquires and transmits the new attribute value set 220 to the trained predicted RNN 130 as a new input. The method 400 then returns to step 410, where the prediction engine 170 determines a new predicted attribute value set 220 based on the output of the trained prediction RNN 130. If, however, at step 420, the prediction engine 170 determines that the device data stream 172 does not include a new attribute value set 220, then the method 400 terminates.

In sum, the disclosed techniques may be used to automatically predict forward-looking levels of network availability for a device network based on attribute value sets associated with network devices included in the device network. Each attribute value set specifies a different set of attribute values for a device attribute set at a different time. The device attribute set specifies a set of device attributes, where each device attribute is a different combination of a network device and an attribute associated with the network device.

Initially, in a training phase, an unsupervised training engine trains an untrained RNN based on a historical device dataset to generate a trained prediction RNN. The historical device dataset includes, without limitation, attribute value sets associated with times that have occurred. The trained prediction RNN maps one or more past attribute values sets observed over a time window to a predicted, forward-looking attribute value set. Also during the training phase, a supervised training engine generates a trained classification model based on the historical device dataset and a historical network performance dataset associated with the device network. The trained classification model maps an attribute value set for the device attribute set to a network availability data point that predicts a level of availability of the device network.

In a subsequent evaluation phase, a prediction subsystem receives a device data stream that includes attribute value sets in real-time and generates a predicted, forward-looking device data stream. The prediction subsystem includes, without limitation, a prediction engine and a classification engine. In operation, the prediction engine periodically receives a current attribute value set that specifies the current attribute values for the set of device attributes. Upon receiving the current attribute value set, the prediction engine inputs the current attribute value set to the trained prediction RNN. The trained prediction RNN processes the current attribute value set based on previous attribute value sets included in the device data stream to generate a predicted attribute value set that is included in a predicted device data stream. A classification engine receives the predicted device data stream and generates a network availability prediction stream that predicts levels of availability of the device network. More precisely, upon receiving a predicted attribute value set associated with a forward-looking time Z, the classification engine generates a new network availability data point that is associated with the forward-looking time Z. The classification engine then includes the new network availability data point in the network availability prediction stream.

At least one technical advantage of the disclosed techniques relative to prior art solutions is that the prediction subsystem automatically predicts forward-looking levels of availability for the device network. Consequently, unlike conventional monitoring tools that enable troubleshooting and remediation actions after at last one network device is deficient, the prediction subsystem enables effective troubleshooting operations and other remedial activities to be performed preemptively based on the network availability prediction stream. In particular, the prediction subsystem enables troubleshooting operations and other remedial activities to be performed before the actual availability of the device network falls below some appropriate or desired level. Consequently, the amount of time during which network availability is below the appropriate or desired level can be substantially reduced compared to prior art approaches. These technical advantages provide one or more technological advancements over the prior art.

1. In some embodiments, a computer-implemented method comprises computing a set of predicted attribute values for a set of device attributes associated with a device network based on a trained recurrent neural network (RNN) and at least one set of past attribute values for the set of device attributes; and performing one or more classification operations based on the set of predicted attribute values and one or more machine-learned classification criteria to generate a network availability data point that predicts a first level of availability of the device network, wherein at least one preemptive action is subsequently performed on the device network based on the network availability data point.

2. The computer-implemented method of clause 1, further comprising performing one or more unsupervised machine-learning operations on an untrained RNN based on a historical dataset that includes a plurality of sets of attribute values for the set of device attributes to generate the trained RNN.

3. The computer-implemented method of clauses 1 or 2, wherein the trained RNN comprises a trained long short-term memory network.

4. The computer-implemented method of any of clauses 1-3, further comprising performing one or more clustering operations based on a historical dataset that includes a plurality of sets of attribute values for the set of device attributes to generate a plurality of clusters; and performing one or more supervised learning operations on a plurality of labeled clusters derived from the plurality of clusters and a historical performance dataset to generate the one or more machine-learned classification criteria.

5. The computer-implemented method of any of clauses 1-4, wherein the one or more machine-learned classification criteria comprise a rule set that maps the set of predicted attribute values to the network availability data point.

6. The computer-implemented method of any of clauses 1-5, wherein a first device attribute included in the set of device attributes is associated with at least one of latency, dropped packets, energy usage, memory utilization, central processing unit (CPU) utilization, machine-generated data, thermal data, cyclic redundancy check (CRC) errors, vibration level, energy usage, link state, and error messaging.

7. The computer-implemented method of any of clauses 1-6, wherein a first device attribute included in the set of device attributes and a second device attribute included in the set of device attributes are associated with different devices included in the device network.

8. The computer-implemented method of any of clauses 1-7, wherein the network availability data point comprises a probability distribution associated with a plurality of network states, wherein each network state is associated with a different level of degradation in network availability.

9. The computer-implemented method of any of clauses 1-8, further comprising automatically performing the preemptive action based on the network availability data point.

10. In some embodiments, one or more non-transitory computer readable media include instructions that, when executed by one or more processors, cause the one or more processors to perform the steps of computing a set of predicted attribute values for a set of device attributes associated with a device network based on a trained recurrent neural network (RNN) and at least one set of past attribute values for the set of device attributes; and performing one or more classification operations based on the set of predicted attribute values and one or more machine-learned classification criteria to generate a network availability data point that predicts a first level of availability of the device network, wherein at least one preemptive action is subsequently performed on the device network based on the network availability data point.

11. The one or more non-transitory computer readable media of clause 10, further comprising generating a windowed dataset based on a prediction window and a historical dataset that includes a plurality of sets of attribute values for the set of device attributes; determining a set of expected output attribute values for the set of device attributes based on a prediction offset and the historical dataset; and performing one or more unsupervised machine-learning operations on an untrained RNN based on the windowed dataset and the set of expected output attribute values to generate the trained RNN.

12. The one or more non-transitory computer readable media of clauses 10 or 11, wherein the trained RNN comprises a trained long short-term memory network.

13. The one or more non-transitory computer readable media of any of clauses 10-12, further comprising generating the one or more machine-learned classification criteria based on at least one clustering algorithm and a historical dataset that includes a plurality of sets of attribute values for the set of device attributes.

14. The one or more non-transitory computer readable media of any of clauses 10-13, wherein the one or more machine-learned classification criteria comprise a rule set that maps the set of predicted attribute values to the network availability data point.

15. The one or more non-transitory computer readable media of any of clauses 10-14, wherein a first device attribute included in the set of device attributes is associated with at least one of latency, dropped packets, energy usage, memory utilization, central processing unit (CPU) utilization, machine-generated data, thermal data, cyclic redundancy check (CRC) errors, vibration level, energy usage, link state, and error messaging.

16. The one or more non-transitory computer readable media of any of clauses 10-15, wherein a first device attribute included in the set of device attributes and a second device attribute included in the set of device attributes are associated with different devices included in the device network.

17. The one or more non-transitory computer readable media of any of clauses 10-16, wherein the network availability data point comprises a probability distribution associated with a plurality of network states, wherein each network state is associated with a different level of degradation in network availability.

18. The one or more non-transitory computer readable media of any of clauses 10-17, further comprising automatically performing the preemptive action based on the network availability data point by automatically re-allocating one or more computing resources to at least one device included in the device network.

19. In some embodiments, a system comprises one or more memories storing instructions; and one or more processors that are coupled to the one or more memories and, when executing the instructions, are configured to compute a set of predicted attribute values for a set of device attributes associated with a device network based on a trained recurrent neural network (RNN) and at least one set of past attribute values for the set of device attributes; and perform one or more classification operations based on the set of predicted attribute values and one or more machine-learned classification criteria to generate a network availability data point that predicts a first level of availability of the device network, wherein at least one preemptive action is subsequently performed on the device network based on the network availability data point.

20. The system of clause 19, wherein the trained RNN comprises a trained long short-term memory network.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    for each device included in a plurality of interconnected devices within a device network, executing a trained recurrent neural network (RNN) that generates a set of predicted attribute values for a set of device attributes associated with the device based on input that includes at least one set of past attribute values for the set of device attributes, wherein the set of device attributes characterizes an operation of the device within the device network, and wherein the set of predicted attribute values is associated with a forward-looking time step and the at least one set of past attribute values is associated with one or more time steps occurring prior to the forward-looking time step; and
    performing one or more classification operations based on the sets of predicted attribute values for the plurality of interconnected devices and one or more machine-learned classification criteria to predict a plurality of probabilities for a plurality of levels of degradation in a network availability of the device network, wherein at least one preemptive action is subsequently performed on the device network based on the plurality of probabilities for the plurality of levels of degradation in the network availability.

2. The computer-implemented method of claim 1, further comprising performing one or more unsupervised machine-learning operations on an untrained RNN based on a historical dataset that includes a plurality of sets of attribute values for the set of device attributes to generate the trained RNN.

3. The computer-implemented method of claim 1, wherein the trained RNN comprises a trained long short-term memory network.

4. The computer-implemented method of claim 1, further comprising:
    performing one or more clustering operations based on a historical dataset that includes (i) a plurality of sets of attribute values for the set of device attributes and (ii) a plurality of time steps associated with the plurality of sets of attribute values to generate a plurality of clusters;
    generating a plurality of labeled clusters corresponding to the plurality of clusters based on the plurality of clusters and one or more incident reports associated with the plurality of time steps; and
    performing one or more supervised learning operations on the plurality of labeled clusters to generate the one or more machine-learned classification criteria.

5. The computer-implemented method of claim 1, wherein the one or more machine-learned classification criteria comprise a rule set that maps the set of predicted attribute values to the plurality of probabilities for the plurality of levels of degradation in the network availability of the device network.

6. The computer-implemented method of claim 1, wherein a first device attribute included in the set of device attributes is associated with at least one of latency, dropped packets, energy usage, memory utilization, central processing unit (CPU) utilization, machine-generated data, thermal data, cyclic redundancy check (CRC) errors, vibration level, energy usage, link state, or error messaging.

7. The computer-implemented method of claim 1, wherein a first device attribute included in the set of device attributes and a second device attribute included in the set of device attributes are associated with different devices included in the device network.

8. The computer-implemented method of claim 1, wherein each level of degradation included in the plurality of levels of degradation corresponds to a range of degradations in the network availability.

9. The computer-implemented method of claim 1, further comprising automatically performing the at least one preemptive action based on the plurality of probabilities for the plurality of levels of degradation in the network availability.

10. One or more non-transitory computer readable media including instructions that, when executed by one or more processors, cause the one or more processors to perform the steps of:
    for each device included in a plurality of interconnected devices within a device network, executing a trained recurrent neural network (RNN) that generates a set of predicted attribute values for a set of device attributes associated with the device based on input that includes at least one set of past attribute values for the set of device attributes, wherein the set of device attributes characterizes an operation of the device within the device network, and wherein the set of predicted attribute values is associated with a forward-looking time step and the at least one set of past attribute values is associated with one or more time steps occurring prior to the forward-looking time step; and
    performing one or more classification operations based on the sets of predicted attribute values for the plurality of interconnected devices and one or more machine-learned classification criteria to predict a plurality of probabilities for a plurality of levels of degradation in a network availability of the device network, wherein at least one preemptive action is subsequently performed on the device network based on the plurality of probabilities for the plurality of levels of degradation in the network availability.

11. The one or more non-transitory computer readable media of claim 10, wherein the instructions that, when executed by the one or more processors, cause the one or more processors to further perform the steps of:
    generating a windowed dataset based on a prediction window and a historical dataset that includes a plurality of sets of attribute values for the set of device attributes;
    determining a set of expected output attribute values for the set of device attributes based on a prediction offset and the historical dataset; and
    performing one or more unsupervised machine-learning operations on an untrained RNN based on the windowed dataset and the set of expected output attribute values to generate the trained RNN.

12. The one or more non-transitory computer readable media of claim 10, wherein the trained RNN comprises a trained long short-term memory network.

13. The one or more non-transitory computer readable media of claim 10, wherein the instructions that, when executed by the one or more processors, cause the one or more processors to further perform the step of generating the one or more machine-learned classification criteria based on at least one clustering algorithm and a historical dataset that includes a plurality of sets of attribute values for the set of device attributes.

14. The one or more non-transitory computer readable media of claim 10, wherein the one or more machine-learned classification criteria comprise a rule set that maps the set of predicted attribute values to the plurality of probabilities for the plurality of levels of degradation in the network availability of the device network.

15. The one or more non-transitory computer readable media of claim 10, wherein a first device attribute included in the set of device attributes is associated with at least one of latency, dropped packets, energy usage, memory utilization, central processing unit (CPU) utilization, machine-generated data, thermal data, cyclic redundancy check (CRC) errors, vibration level, energy usage, link state, or error messaging.

16. The one or more non-transitory computer readable media of claim 10, wherein a first device attribute included in the set of device attributes and a second device attribute included in the set of device attributes are associated with different devices included in the device network.

17. The one or more non-transitory computer readable media of claim 10, wherein each level of degradation included in the plurality of levels of degradation corresponds to a range of degradations in the network availability.

18. The one or more non-transitory computer readable media of claim 10, wherein the instructions that, when executed by the one or more processors, cause the one or more processors to further perform the step of automatically performing the at least one preemptive action based on the plurality of levels of degradation in the network availability by automatically re-allocating one or more computing resources to at least one device included in the device network.

19. A system, comprising:
    one or more memories storing instructions; and
    one or more processors that are coupled to the one or more memories and, when executing the instructions, are configured to:
        for each device included in a plurality of interconnected devices within a device network, execute a trained recurrent neural network (RNN) that generates a set of predicted attribute values for a set of device attributes associated with the device based on input that includes at least one set of past attribute values for the set of device attributes, wherein the set of device attributes characterizes an operation of the device within the device network, and wherein the set of predicted attribute values is associated with a forward-looking time step and the at least one set of past attribute values is associated with one or more time steps occurring prior to the forward-looking time step; and
        perform one or more classification operations based on the sets of predicted attribute values for the plurality of interconnected devices and one or more machine-learned classification criteria to predict a plurality of probabilities for a plurality of levels of degradation in a network availability of the device network, wherein at least one preemptive action is subsequently performed on the device network based on the plurality of probabilities for the plurality of levels of degradation in the network availability.

20. The system of claim 19, wherein the trained RNN comprises a trained long short-term memory network.

\* \* \* \* \*